(12) United States Patent
Vasudev et al.

(10) Patent No.: US 10,387,439 B2
(45) Date of Patent: Aug. 20, 2019

(54) CONFIGURING SERVICE CONSOLES BASED ON SERVICE FEATURE TEMPLATES USING A DATABASE SYSTEM

(71) Applicant: salesforce.com, inc., San Francisco, CA (US)

(72) Inventors: Gautam Vasudev, San Francisco, CA (US); Frédéric Voituret, Joinville le Pont (FR)

(73) Assignee: salesforce.com, inc., San Francisco, CA (US)

(*) Notice: Subject to any disclaimer, the term of this patent is extended or adjusted under 35 U.S.C. 154(b) by 562 days.

(21) Appl. No.: 15/154,011

(22) Filed: May 13, 2016

(65) Prior Publication Data
US 2017/0076295 A1    Mar. 16, 2017

Related U.S. Application Data

(60) Provisional application No. 62/217,442, filed on Sep. 11, 2015.

(51) Int. Cl.
| | |
|---|---|
| *G06F 16/00* | (2019.01) |
| *G06F 16/25* | (2019.01) |
| *G06Q 30/00* | (2012.01) |
| *H04L 12/24* | (2006.01) |
| *G06F 16/22* | (2019.01) |

(52) U.S. Cl.
CPC .............. *G06F 16/25* (2019.01); *G06F 16/22* (2019.01); *G06Q 30/016* (2013.01); *H04L 41/5064* (2013.01)

(58) Field of Classification Search
CPC .......... G06F 17/30557; G06F 17/3056; G06F 17/30312; G06F 16/25; G06F 16/22

USPC ....................................................... 707/791
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Thu Nguyen T Le
(74) *Attorney, Agent, or Firm* — Weaver Austin Villeneuve & Sampson LLP

(57) ABSTRACT

Disclosed are examples of systems, apparatus, methods and computer program products for configuring service consoles based on service feature templates using a database system. In some implementations, a database of a database system storing service feature templates can be maintained. A request for a service console comprising a console component can be processed. A service feature template comprising a template console component corresponding to the console component can be identified. A set of CRM records can be identified. It can be determined that a user has access to the console component. A graphical representation of the service console can be displayed in a user interface on a display of a device of the user.

20 Claims, 11 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,899,903 B2 * | 3/2011 | Sanghvi ............... G06F 11/30 709/221 |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,693,649 B2 | 4/2014 | Casalaina et al. |
| 8,718,241 B2 | 5/2014 | Casalaina et al. |
| 9,197,513 B2 | 11/2015 | Vasudev et al. |
| 9,215,096 B2 | 12/2015 | Vasudev et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0086345 A1 * | 4/2008 | Wilson ............... G06F 17/3089 705/7.11 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0201641 A1 | 7/2014 | Casalina et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0039768 A1 * | 2/2015 | Matczynski ........ H04L 41/0896 709/226 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2016/0048281 A1 | 2/2016 | Vasudev et al. |
| 2016/0065522 A1 | 3/2016 | Vasudev et al. |

\* cited by examiner

Standard Console Template  700

Quick find

Admin
Users
Data
Email

Tools
Apps
Customize
UI
Code

Settings
Company
Identity
Security

| Name | Created | Description | Actions |
|---|---|---|---|
| > Service Console 1 | 4/12/15 | Email Console | View  Edit  Configure |
| > My Service Console | 4/15/15 | Console with 2 Channels | View  Edit  Configure |
| ∨ Service Console 2 | 6/15/15 | New Console | View  Edit  Configure |

704
708

Service Console 2 Features | Feature Actions  712

| | |
|---|---|
| Lookup Case Contact | View  Edit  Configure |
| Case highlights | View  Edit  Configure |
| Knowledge One Sidebar | View  Edit  Configure |
| Topics | View  Edit  Configure |
| Milestones | Reinstall |
| Case Experts | View  Edit  Configure |

Create

*FIGURE 7*

CONFIGURING SERVICE CONSOLES BASED ON SERVICE FEATURE TEMPLATES USING A DATABASE SYSTEM

PRIORITY DATA

This patent document claims priority to and commonly assigned U.S. Provisional Patent Application No. 62/217,442, titled "AUTOMATICALLY CONFIGURING SERVICE CONSOLES BASED ON SERVICE FEATURE TEMPLATES IN A DATABASE SYSTEM", by Vasudev et al., filed on Sep. 11, 2015, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to service consoles in the context of database systems. More specifically, this patent document discloses techniques for configuring service consoles based on service feature templates using a database system.

BACKGROUND

"Cloud computing" services provide shared resources, applications, and information to computers and other devices upon request. In cloud computing environments, services can be provided by one or more servers accessible over the Internet rather than installing software locally on in-house computer systems. As such, users having a variety of roles can interact with cloud computing services.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 7 shows an example of a user interface 700 in the form of a GUI as displayed on a computing device presenting a list of template console components generated according to service feature templates, in accordance with some implementations.

DETAILED DESCRIPTION

Figure 1:
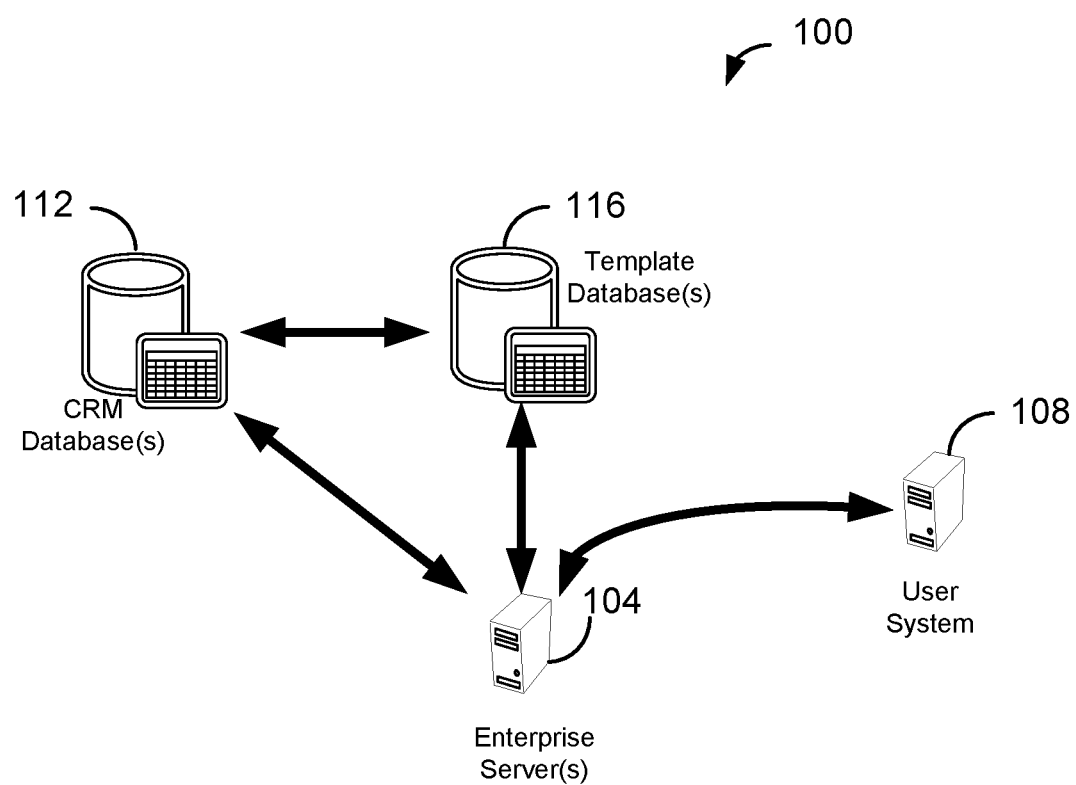
FIG. 1 shows a system diagram of an example of a system 100 for configuring service consoles based on service feature templates, in accordance with some implementations.

Examples of systems, apparatus, methods and computer-readable storage media according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some of the disclosed implementations of systems, apparatus, methods and computer program products are for configuring service consoles based on service feature templates. For example, a new customer of a cloud-based service console can quickly try out different layouts and configurations of service consoles through service feature templates configured to implement the desired functionality in a service console. In another example, an existing customer may add a recently released feature to their cloud-based service console through a selection of a service feature template. In some implementations, a service console is a graphical user interface combining tabs, subtabs, and components to quickly and efficiently address customer concerns in an enterprise environment. As such, a service console can streamline the help desk experience in one easy-to-use user interface.

In a conventional enterprise computing system providing integrated social networking and customer relationship management (CRM) databases and services, there can be a multitude of features available to a user. Features include social network feeds, case history, multi-channel publishers, etc. However, a user may only wish to use some of the available features of the enterprise computing system. Unused features, however, could improve the user's productivity and experience when interacting with the enterprise computing system. In conventional scenarios, when a user wants to try new features, a system administrator manually configures and implements the features for the user, which might take weeks or even months to implement. These features are often never implemented because of the complexity in setting them up for the user. In addition, features are also not implemented because the rate at which new features are released can outpace system administrator resources for implementing the new features. Consequently, users are sometimes left without features that would otherwise improve their job performance.

By way of illustration, Super Calc is a calculator manufacturing company with a long history of providing difficult to operate but useful calculators. In order to improve their customer service, Super Calc created an account with salesforce.com, inc. in 2010. Super Calc, with the help of an outside consulting firm, implemented the latest features provided by salesforce.com, inc. and saw an immediate improvement in their customer service operations. Malcolm, a customer service representative at Super Calc, was able to handle more calls and emails than ever before.

As a consequence of an economic crisis three years later, Super Calc's sales are down, and many of Malcolm's customer service team members have been laid off. Also in those three years, salesforce.com added many new features that would further improve the customer service at Super Calc. Implementation of these new features would allow Malcolm to handle calls and emails that otherwise would have been handled by the laid off team members. Unfortunately, Super Calc does not have the extra capital necessary to hire a consulting firm to implement these new features. Without these features, customer service declines and Super Calc suffers further financial losses from the loss of customers.

However, the most recent salesforce.com, inc. release includes some examples of the disclosed techniques, which can be implemented to configure a service console based on service feature templates. By way of example, Malcolm can navigate to a page maintained by salesforce.com, inc. that includes the new feature: "Knowledge One Sidebar". In order to try out this new feature, Malcolm selects the service feature template for "Knowledge One Sidebar". Upon selection, a service console is set up automatically with the Knowledge One Sidebar in Malcolm's user environment, allowing Malcolm to quickly begin using this feature and respond to the extra calls and emails. Super Calc is so impressed with the productivity gained from using the updated service console that they want to modernize their entire salesforce.com experience for all their employees. After informing their original outside consulting firm that salesforce.com now includes easily accessible service feature templates for new and existing features, Super Calc is able to negotiate a new and more financially favorable consulting contract with the outside consulting firm.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

In some but not all implementations, the disclosed methods, apparatus, systems, and computer-readable storage media may be configured or designed for use in a multi-tenant database environment.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

FIG. 1 shows a system diagram of an example of a system 100 for configuring service consoles based on service feature templates using a database system, in accordance with some implementations. System 100 includes a variety of different hardware and/or software components which are in communication with each other. In the non-limiting example of FIG. 1, system 100 includes at least one enterprise server 104, at least one CRM database 112, and at least one template database 116. CRM database 112 can store and maintain data objects such as CRM records of an organization. CRM records include instances of accounts, opportunities, leads, cases, contacts, contracts, campaigns, solutions, quotes, purchase orders, etc. Template database 116 can store and maintain data objects representing service feature templates. In some implementations, a service feature template can include a collection of the following: a set of navigation tab items, navigation tab orientation (e.g. pinned, vertical, or horizontal), a set of footer components, a set of page layouts, a set of case feed settings, a set of Live Agent settings, a set of entitlement settings, a set of service level agreement settings, and a set of social customer service settings. User system 108 can interact with system 100 by sending and receiving data to and from one or more servers and/or databases of system 100. Also or alternatively, a service feature template can include an associated version or version number.

Enterprise server 104 may communicate with other components of system 100. This communication may be facilitated through a combination of networks and interfaces. Enterprise server 104 may handle and process data requests from user system 108. Likewise, enterprise server 104 may return a response to user system 108 after a data request has been processed. For example, enterprise server 104 may retrieve data from one or more databases, combine some or all of the data from different databases, and send the processed data to user system 108.

Also or alternatively, enterprise server 104 can be configured to process organization specific CRM data in combination with service feature templates. In some implementations, a user may request to generate a service console using a service feature template. For example, based on a request by a user, enterprise server 104 can set up a live chat system tailored to large volume, but quick resolution case management. As such, a customer can save thousands of dollars by not implementing the live chat system themselves and by not hiring a consultant to assist in implementing the live chat system.

User system 108 may be a computing device capable of communicating via one or more data networks with a server. Examples of user system 108 include a desktop computer or portable electronic device such as a smartphone, a tablet, a laptop, a wearable device such as Google Glass®, another optical head-mounted display (OHMD) device, a smart watch, etc.

Figure 2:
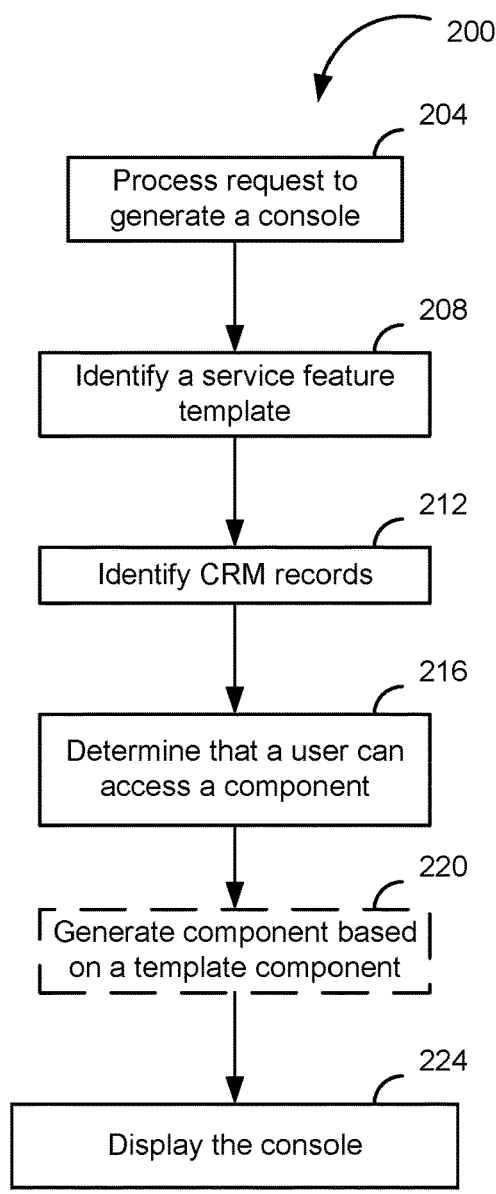
FIG. 2 shows a flow chart of an example of a method 200 for configuring service consoles based on service feature templates using a database system, in accordance with some implementations.

FIG. 2 shows a flow chart of an example of a method 200 for configuring service consoles based on service feature templates using a database system, in accordance with some implementations. Method 200 and other methods described herein may be implemented using system 100 of FIG. 1, although the implementations of such methods are not limited to system 100.

In block 204 of FIG. 2, a server such as enterprise server 104 of FIG. 1 processes a request to generate a service console. In some implementations, enterprise server 104 receives a request from user system 108, for instance, a user selecting create button 420 of FIG. 4 can send a request to enterprise server 104 of FIG. 1. In other implementations, the request can originate from enterprise server 104.

A service console can allow a customer service representative to monitor and respond through a variety of customer channels from one screen. Additionally, a service console may be a combination of many console components. Console components can provide help desk functionality to assist customer service representatives in particular aspects of their job, for instance, an interaction log panel, which shows the history of past communications with a customer. In some implementations, a service console includes navigation tabs for selecting CRM records, a primary tab for displaying the main item, e.g. a case being worked on, and subtab that displays items related to the primary tab, e.g. a contact for a case.

Figure 3:
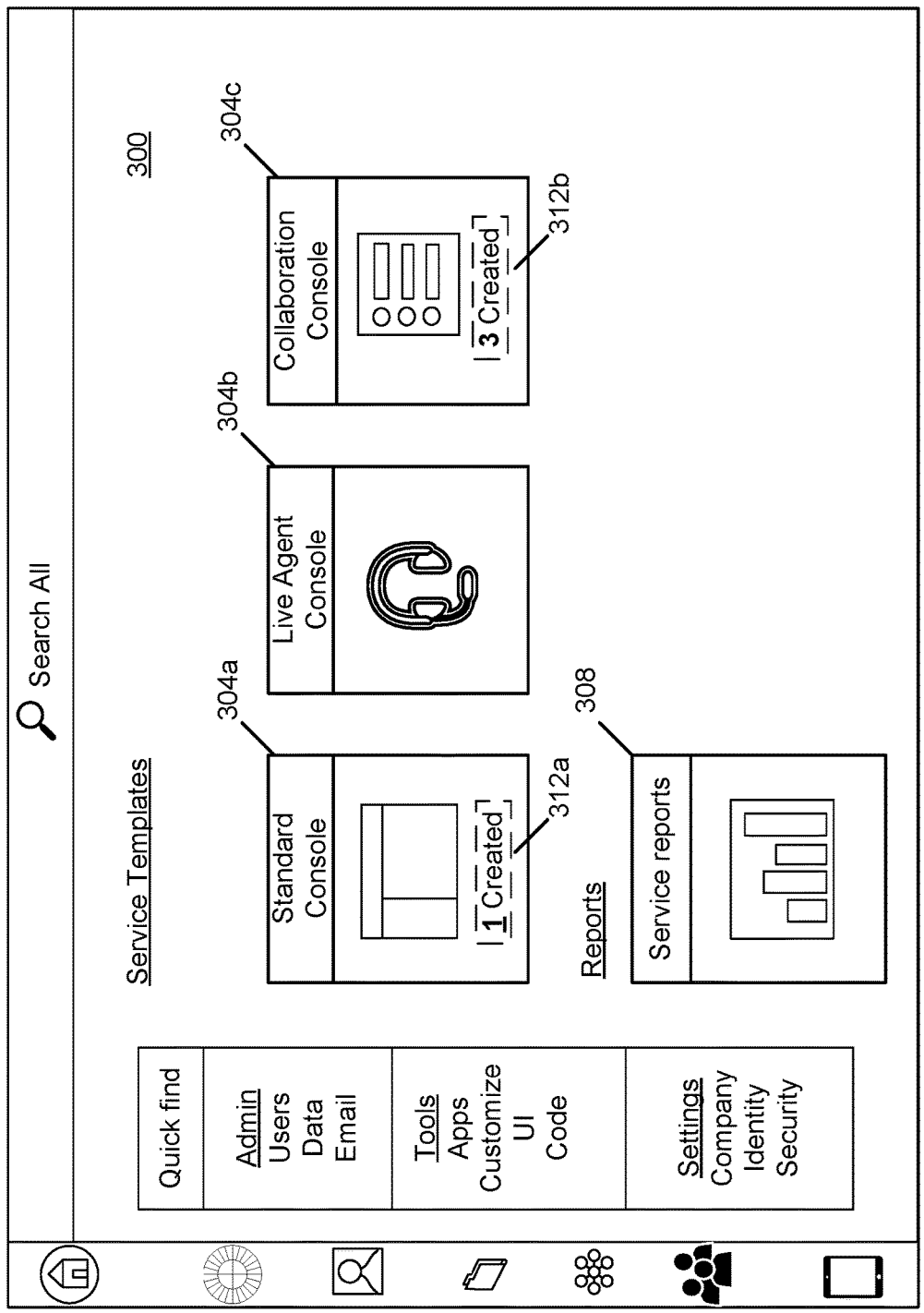
FIG. 3 shows an example of a user interface 300 in the form of a graphical user interface (GUI) as displayed on a computing device for requesting a service console to be generated according to a service feature template, in accordance with some implementations.

For example, FIG. 3 shows an example of a user interface 300 in the form of a graphical user interface (GUI) as displayed on a computing device for requesting a service console to be generated according to a service feature template, in accordance with some implementations. In this example, a user of user system 108 of FIG. 1 may be presented with service feature templates 304a, 304b, and 304c of FIG. 3. These service feature templates may correspond to a graphical representation of a service console that can be generated by enterprise server 104 of FIG. 1. For each of service feature templates 304a, 304b, and 304c of FIG. 3, there may be a corresponding creation total. For example, service feature template 304a includes a creation total 312a of "1," which indicates that one console has been created based on the "Standard Console" template. Similarly, service console 304c has a creation total 312b of "3," indicating that three consoles have been created based on the "Collaboration Console" template. As seen in FIG. 3, by selecting service feature template 304a, a user could request a "Standard Console" to be generated by enterprise server 104 of FIG. 1. In some implementations, a "Standard Console" is a basic service console that includes basic console components for checking out essential features of the service console. Also or alternatively, a user could select service feature template 304b of FIG. 3 for a "Live Agent Console," which is a service console that includes console components for a call center agent. Also or alternatively, a user could select service feature template 304c for a "Collaboration Console," which is a service console with collaborative social features such as a case feed. In other implementations, a user may select a component template 308 to generate a console component of a service console. A component template can be a more granular form of a template. For example, a user may wish to generate a component based on a "Service Report" component template. The service report component generated from the component template can be generated independently and distinctly from a particular service console. Also or alternatively, if any of the service feature templates or component templates includes features that aren't enabled for their organization or not yet released to the public, then the service feature may have a dimmed appearance indicating a lack of access. For example, the "Live Agent" feature of service template 304b may have a release date six months in the future, but in order to generate awareness of the coming release, a dimmed version of service feature template 304b may be displayed. However, a user would be unable to generate a service console based on a dimmed version of a service feature template. In some implementations, a combination of service feature templates and component templates are identified and "chained" together to provide a larger template with more sophisticated functionality.

Figure 8A:
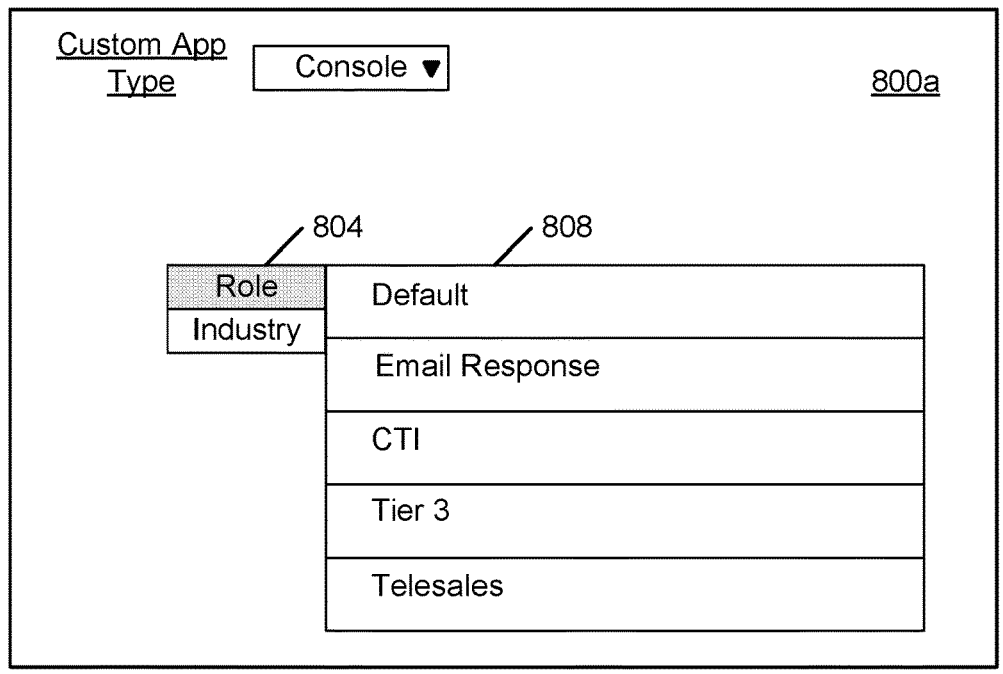
FIG. 8A shows an example of a user interface 800a in the form of a GUI as displayed on a computing device for requesting a service console to be generated according to a service feature template, in accordance with some implementations.
Figure 8B:
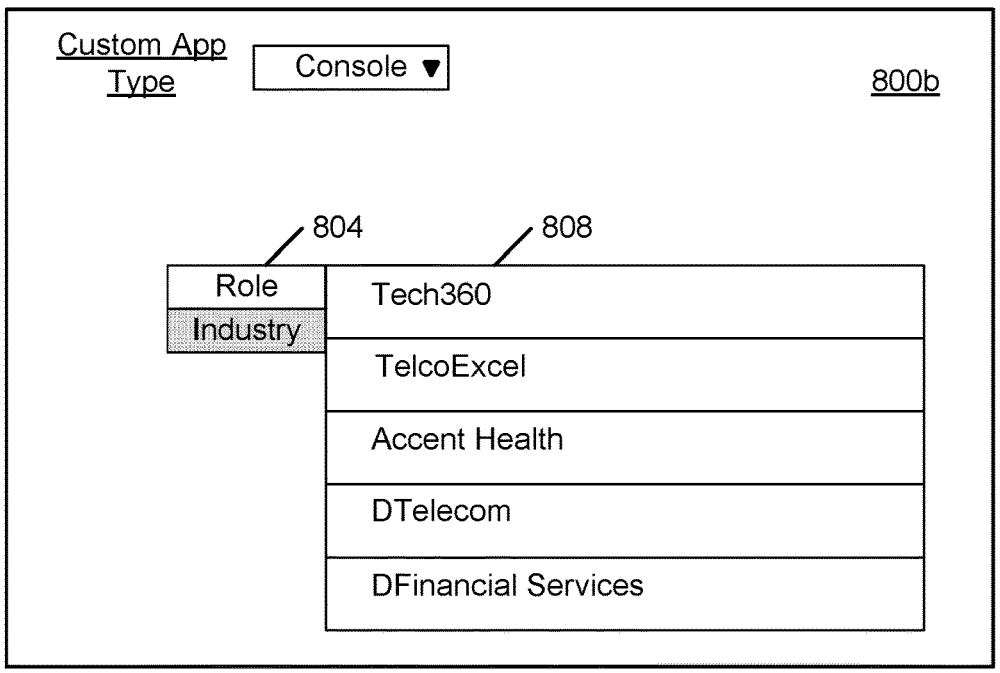
FIG. 8B shows an example of a user interface 800b, which is an updated version of user interface 800a, in the form of a GUI as displayed on a computing device, in accordance with some implementations.

In another example, FIG. 8A shows an example of a user interface 800a in the form of a GUI as displayed on a computing device for requesting a service console to be generated according to a service feature template, in accordance with some implementations. A user may select a category 804 of service feature templates to refine the selection process. As seen in user interface 800a, a user may select "Role" or "Industry" from category 804. A user may then select a particular service feature template from the service feature template list 808. As a user selects between "Role" and "Industry," the service feature templates may be updated as shown in user interface 800b. Also or alternatively, a user may change the type of service feature templates to view in user interfaces 800a and 800b. In the example of FIGS. 8A and 8B a user is viewing "Console" service feature templates. However, a user may change the type from "Console" to "Component" to view component templates according to "Role" and "Industry."

In block 208 of FIG. 2, enterprise server 104 of FIG. 1 identifies a service feature template. In some implementations, a service feature template can be stored among other service feature templates at template database 116. In some implementations, enterprise server 104 may identify a particular service feature template based on data processed in block 204 of FIG. 2. In other implementations, a service feature template can be identified automatically in response to a system event such as a specific date or in response to a user having a console component being recommended by a coworker.

Examples of service feature templates include: "trial service feature template," "email response service feature template," "computer-telephony integration (CTI) service feature template," "tier 3 service feature template," "telesales service feature template," and "agent console service feature template." The "trial service feature template" can be a service feature template that showcases the best of and newest features of a product line. The "email response service feature template" can be a service feature template that is for high volume email and quick customer cases. A customer service representative may typically know how to answer the customer concern right away and without significant research. The "CTI service feature template" is a service feature template that can be tailored for call centers. The customer concerns in a call center are usually minor issues that are quickly resloved, but can also include an occasional long-running major issue. The "tier 3 service feature template" can be a service feature template that is for an environment with front line support and tier 2 support. Customer service representatives may need to catch up quickly and collaborate with other experts. These cases are typically longer running. The "telesales service feature template" can be a service feature template that is for an environment where customer service representatives rely on "call down lists" that they work their way through. The calls are typically very quick, and customer service representatives are compensated on the number of calls made. The "agent console service feature template" can be a service feature template that facilitates the transition from an older version of a service console to a new version of a service console. Other examples can include: "inside sales service feature template," "chat service feature template," and "omnichannel agent service feature template."

In some implementations, an administrator can create a service feature template from an existing view of a service console. The administrator created service feature template may be stored in an organization specific portion of template database 116 of FIG. 1 and later identified by enterprise server 104. To illustrate, an outside consulting firm may wish to create service feature templates to provide quick consulting services to customers that have similar customer management needs for matters that the consulting firm has previously worked on. For example, the consulting firm may create a service feature template from Company A's service console. This service console may be tailored to addressing customer concerns regarding exotic pet birds. Company B would like a service console for addressing customer concerns regarding exotic pet turtles. As such, the consulting firm could use the service feature template from Company A to give Company B an idea of what their service console would look like. In other implementations, a service provider maintaining system 100 may provide and maintain service feature templates for customers of their service. For example, user interface 800b of FIG. 8 includes service feature template list 808, which provides a list of service feature templates particularly tailored to different industries, e.g. healthcare, financial, telecommunications, etc. A telecommunications executive interested in trying out a service console tailored to a telecommunications company could select "DTelecom" from service feature template list 808. Advantageously, this allows the executive to immediately try out a telecommunications service console environment without significant financial investment.

In block 212 of FIG. 2, CRM records are identified by enterprise server 104 of FIG. 1. In some implementations, enterprise server 104 may identify CRM records located in CRM database 112 based on a user profile of user system 108 and/or an organization associated with the user profile. In some implementations, CRM records most relevant to the user are identified. For example, a user may be prompted to specify CRM records to be used with the service feature template. Thus, allowing a service console to be populated with data that is familiar and easy to interact with for the user.

Figure 4:
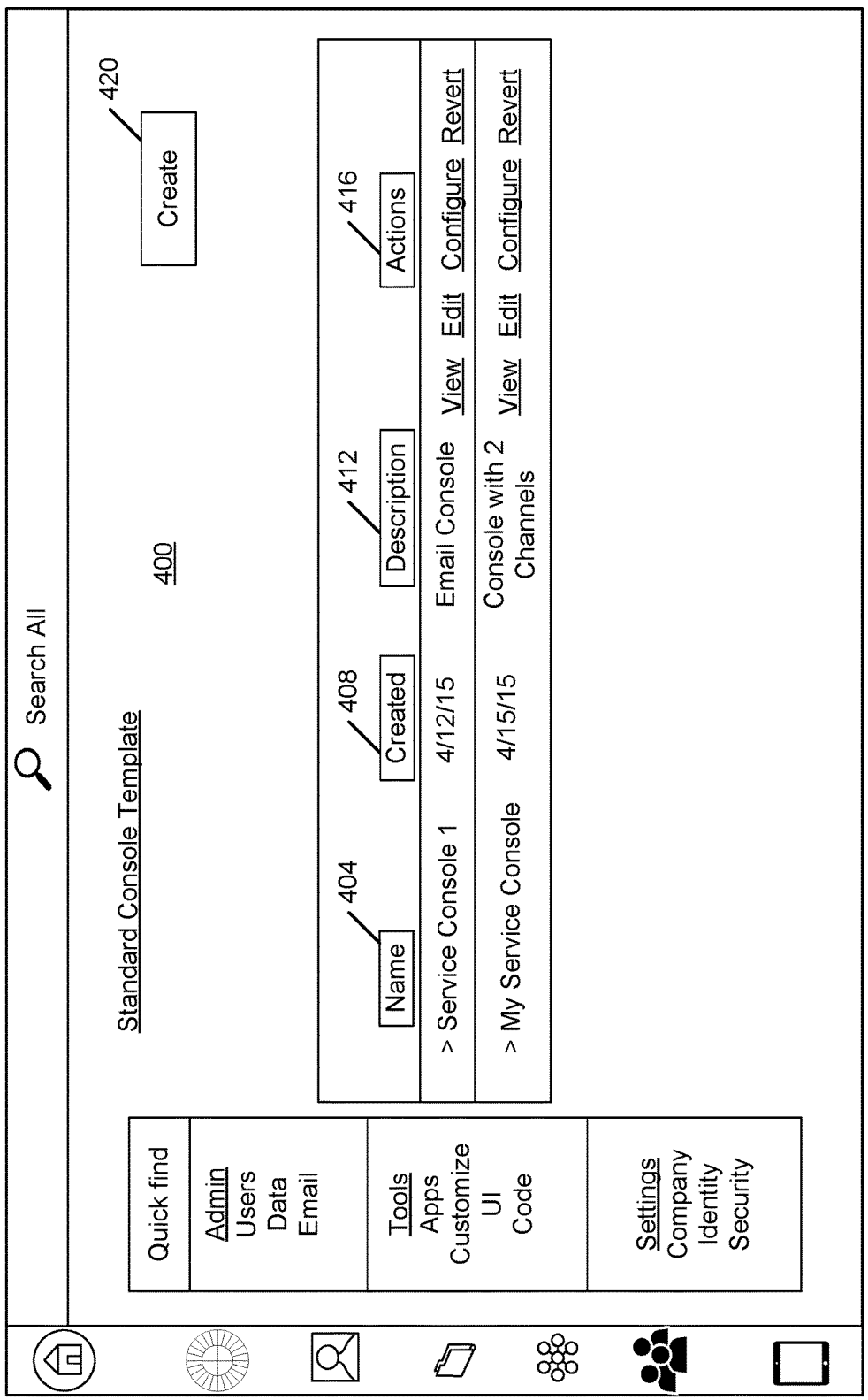
FIG. 4 shows an example of a user interface 400 in the form of a GUI as displayed on a computing device presenting a list of service consoles generated according to service feature templates, in accordance with some implementations.

FIG. 4 shows an example of a user interface 400 in the form of a GUI as displayed on a computing device presenting a list of service consoles generated according to service feature templates, in accordance with some implementations. User interface 400 can display a list view of the generated service consoles. The list view includes different fields, for instance, name field 404, date created field 408, description field 412, and actions field 416. In other implementations, the list view can include different fields such as a "created by field" or "last updated field." A user can sort the list of service feature templates by any of the fields. By way of example in FIG. 4, the service feature templates are sorted by template name field 404. In addition, date created field 408 displays the date a respective service feature was created. As well, description field 412 displays a brief description of a respective service feature template to easily ascertain the type of service feature template. Actions field 416 can receive selections from a user in order to "view," "edit," or "configure" a service console based on a service feature template. Also or alternatively, actions field 416 could also include other selections such as "revert," "uninstall," "share," or "view in different environment." As discussed above regarding block 212 of FIG. 2, a user can specify existing CRM records by selecting "configure" from actions field 416. While some CRM records may automatically be provided by enterprise server 104 of FIG. 1, when the user selects "configure," the user may change or add CRM records to be populated according to the service feature template. Also, a user may select "view" from actions field 416 of FIG. 4, which can cause enterprise server 104 of FIG. 1 to display a preview of a service console based on a respective service feature template. In some implementations, a user selection "view" from actions field 416 may be presented with a test instance or "sandboxed" version of the user's environment. The sandboxed version of a user's environment allows the user to interact with their data, but it does not allow the user to make permanent changes. Thus, a user may test or change a service feature template without compromising important CRM data. In some implementations, a user may select "edit" from actions field 416 of FIG. 4. This may cause user interface 400 to be refreshed and updated with user interface 500 as seen in FIG. 5.

Figure 5:
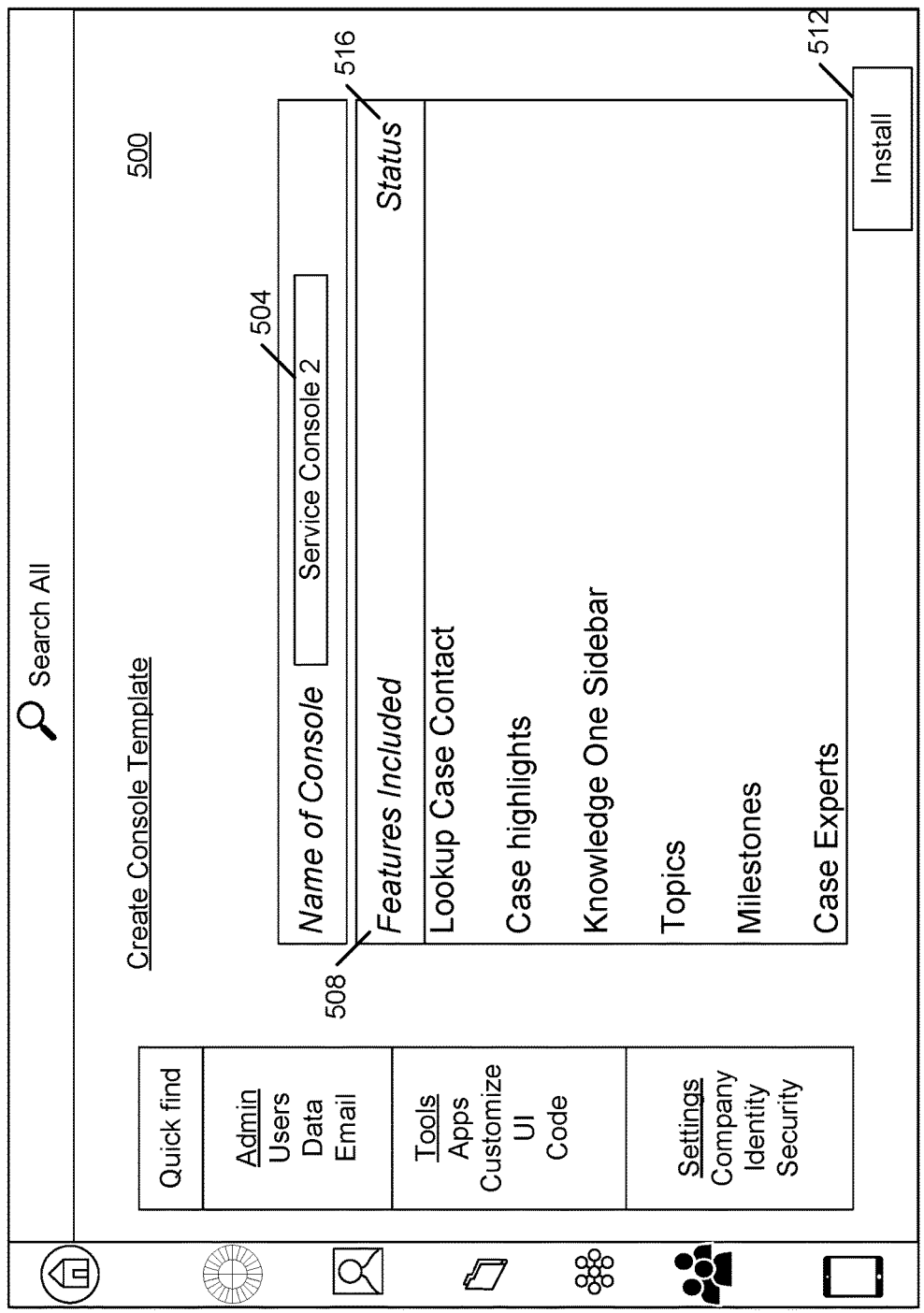
FIG. 5 shows an example of a user interface 500 in the form of a GUI as displayed on a computing device presenting a list of template console components generated according to service feature templates, in accordance with some implementations.

FIG. 5 shows an example of a user interface 500 in the form of a GUI as displayed on a computing device presenting a list of template console components generated according to service feature templates, in accordance with some implementations. A user may select template name field 504 and input text to create a new name for a service feature template. Template console component list 508 includes the template console components that make up the service feature template. Template console component list 508 includes the following template console components: "Lookup Case Contact," "Case Highlights," "Knowledge One Sidebar," "Topics," "Milestones," and "Case Experts." After reviewing template name field 504 and template console component list 508, a user may select submission button 512.

In block 216 of FIG. 2, enterprise server 104 of FIG. 1 determines that a user profile can access a console component. Whether a user profile has access to a console component may depend on whether the user has sufficient permissions to access the console component. In some implementations, if a user has the required license to access a console component, then enterprise server 104 may proceed to block 220 of FIG. 2 discussed below. For example, if a user does not have a license for the console component knowledge articles, then the user would be informed by an indication in the user interface that the user lacked the required license. However, if user has a license for the knowledge article console component and the user, but the user does not have the knowledge article enabled for use, then enterprise server 104 of FIG. 1 could enable the knowledge article component and make it available for use in the generated service console.

Figure 6:
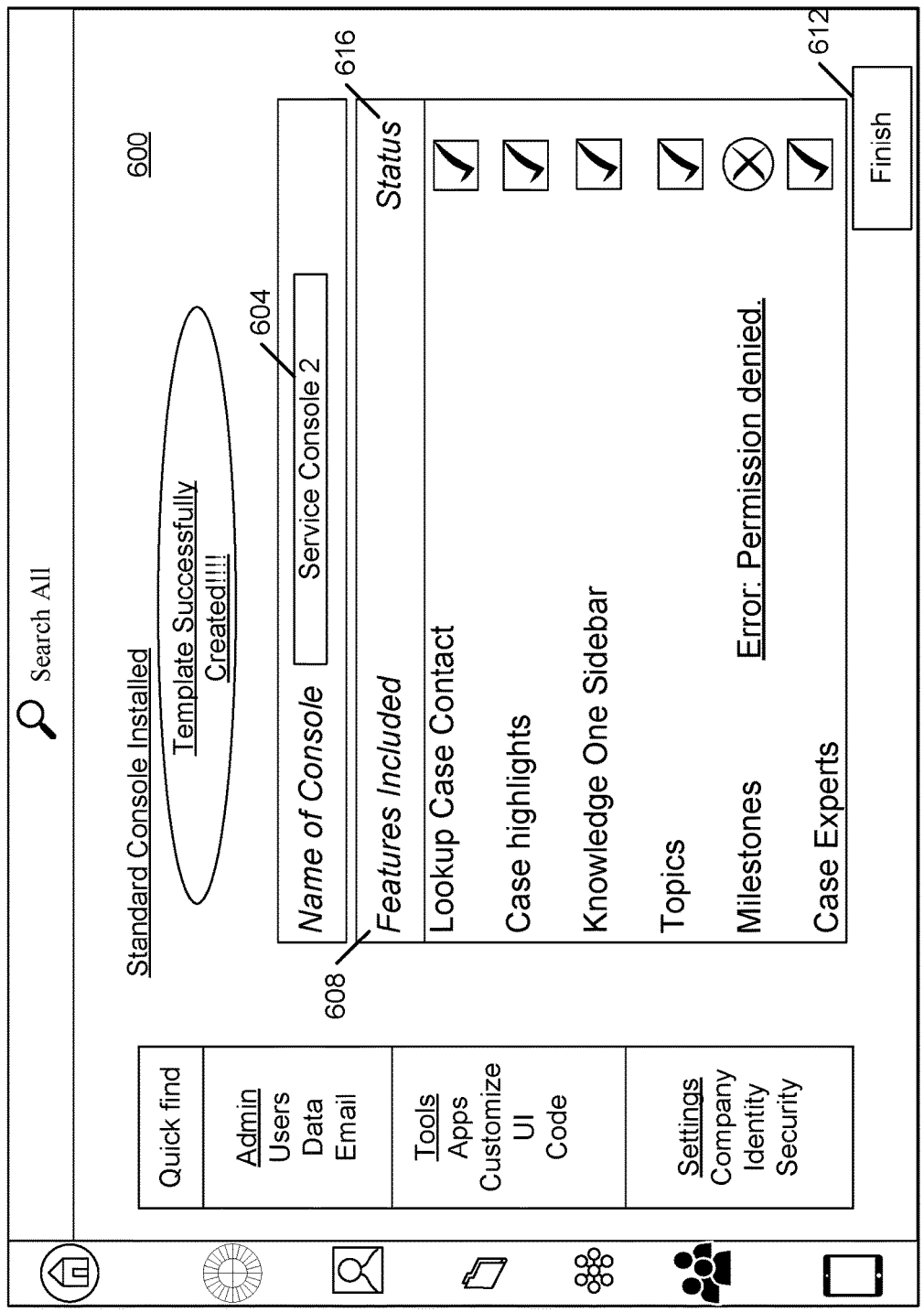
FIG. 6 shows an example of a user interface 600 in the form of a GUI as displayed on a computing device presenting a service console generated based on a service feature template, in accordance with some implementations.

For example, FIG. 6 shows an example of a user interface 600 in the form of a GUI as displayed on a computing device presenting a service console generated based on a service feature template, in accordance with some implementations. Similar to user interface 500 of FIG. 5, user interface 600 of FIG. 6 includes template name field 604, console component list 608, and submission button 612. Status indicator 616 represents whether or not a console component was generated successfully or unsuccessfully. Status indicator 616 can be a green check mark to represent a successfully generated console component and a red X to represent a console component that was not generated. Also or alternatively, depending on a console component status, status indicator 616 can be any positive audiovisual indication and status indicator 616 can be any negative audiovisual indication.

In block 220 of FIG. 2, a console component can be generated based on a template console component. As discussed above, if a user has access to a console component, then enterprise server 104 of FIG. 1 may generate the console component. In some implementations, data from CRM database 112 and template database 116 are combined to generate a service console, which may also be stored in template database 116 or any other database of system 100. As discussed above, a user may customize a service feature template. In addition to this, a user may further customize template console components. For example, FIG. 7 shows an example of a user interface 700 in the form of a GUI as displayed on a computing device presenting a list of template console components generated according to service feature templates, in accordance with some implementations. In this example, a user may select "view," "edit," or "configure" from console component action field 712. Consequently, a user may customize a service feature template at a more granular level to further enhance their experience with a new service console.

In block 224 of FIG. 2, a service console is displayed by enterprise server 104 of FIG. 1. For example, a user may navigate to the service console via a hyperlink such as "view" from actions field 416 of FIG. 4 in user interface 400. Also or alternatively, a user can direct their mouse cursor over description field 412. For example, as the mouse cursor remains near "Email Console," an overlay popup window can display a small preview of a screenshot appearance of "Service Console 1." In some implementations, the overlay popup window displays an animated version of a preview. The animated version may loop a brief video highlighting what is unique about the service feature template. Also or alternatively, the overlay popup windows may change appearance in near real-time as a user directs their mouse cursor between descriptions. For example, a mouse cursor hovering over "Email Console" may cause the appearance of a service console that is used to quickly answer short questions to customer concerns. As the mouse cursor navigates away from "Email Console" to "Console with 2 Channels," user interface 400 may be refreshed without interruption to show a service console configured to customer concerns through email and through social networking clients.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 9A:
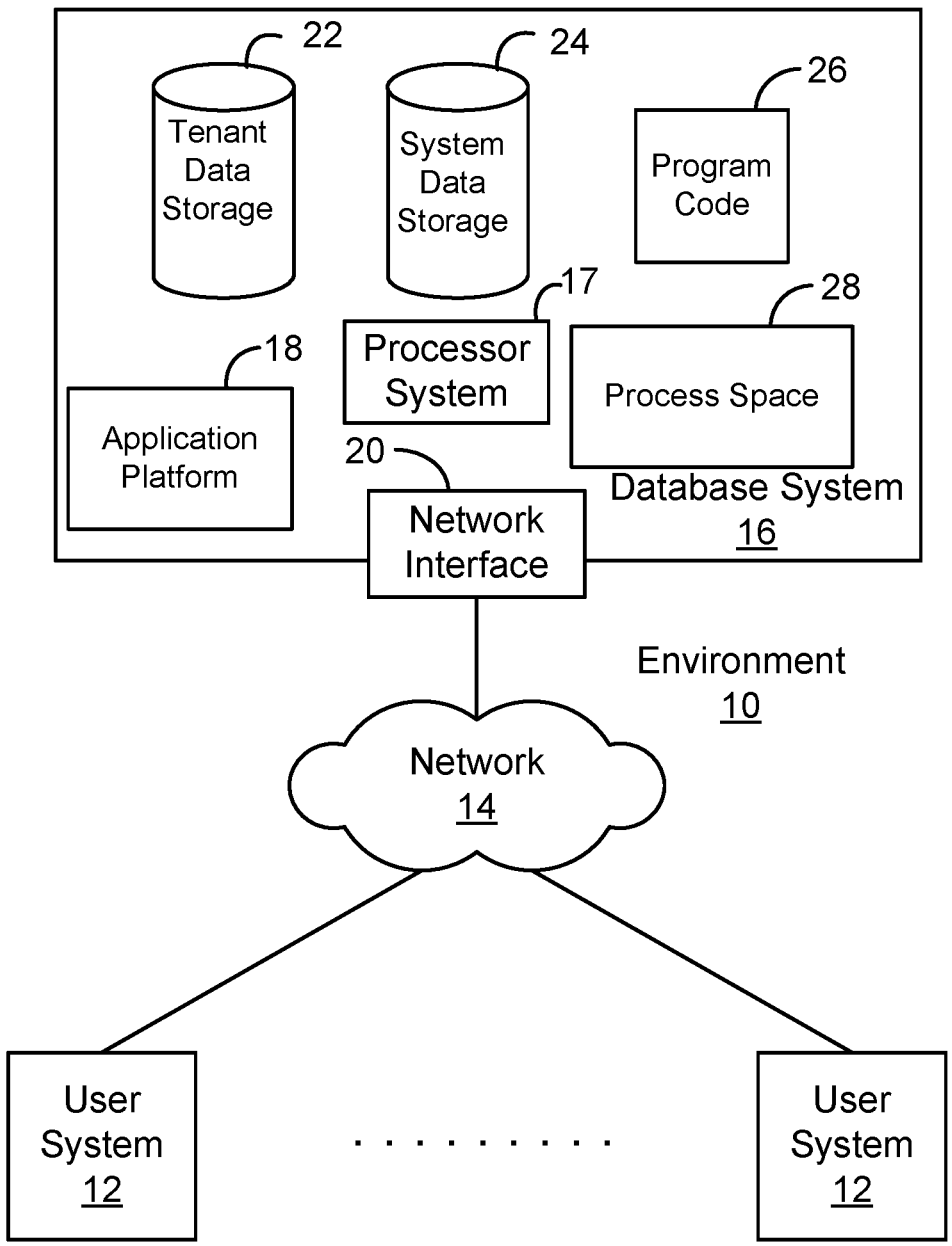
FIG. 9A shows a block diagram of an example of an environment 10 in which an on-demand database service can be used in accordance with some implementations.

FIG. 9A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 9A (and in more detail in FIG. 9B) user systems 12 might interact via a network 14 with an on-demand database service, which is implemented in the example of FIG. 9A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 9A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 9B:
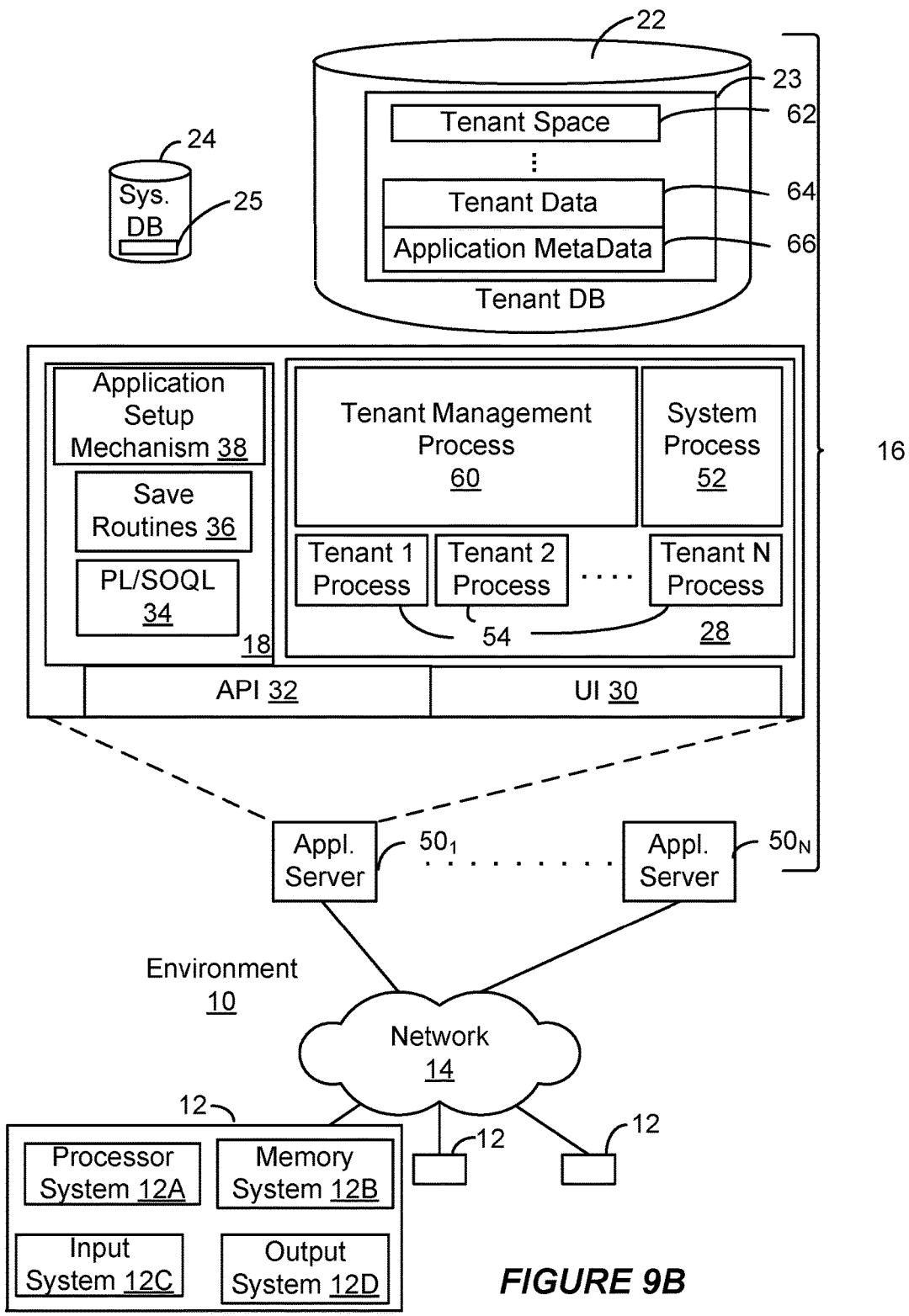
FIG. 9B shows a block diagram of an example of some implementations of elements of FIG. 9A and various possible interconnections between these elements.

One arrangement for elements of system 16 is shown in FIGS. 9A and 9B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 9A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 9B shows a block diagram of an example of some implementations of elements of FIG. 9A and various possible interconnections between these elements. That is, FIG. 9B also illustrates environment 10. However, in FIG. 9B elements of system 16 and various interconnections in some implementations are further illustrated. FIG. 9B shows that user system 12 may include processor system 12A, memory system 12B, input system 12C, and output system 12D. FIG. 9B shows network 14 and system 16. FIG. 9B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 9A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 9B, system 16 may include a network interface 20 (of FIG. 9A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein.

Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
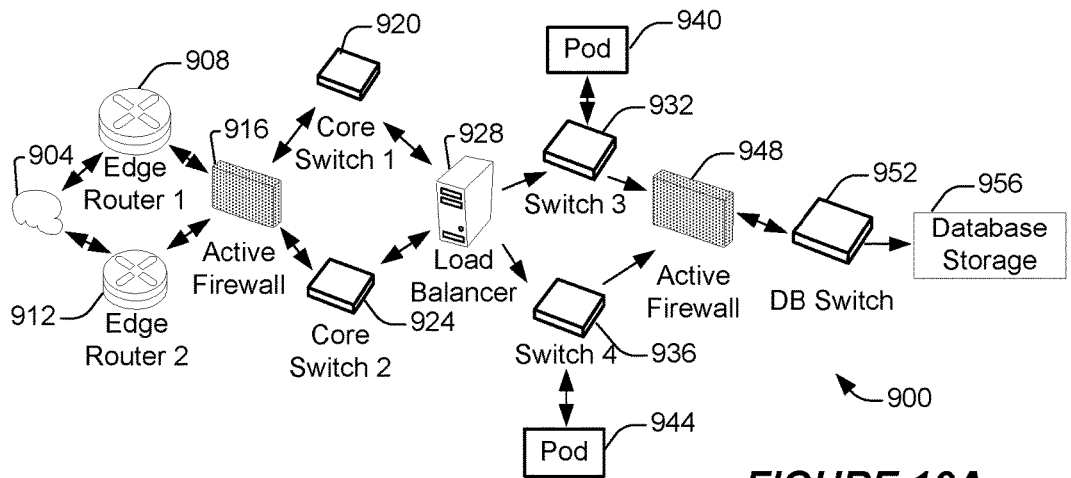
FIG. 10A shows a system diagram of an example of architectural components of an on-demand database service environment 900, in accordance with some implementations.

FIG. 10A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 10B:
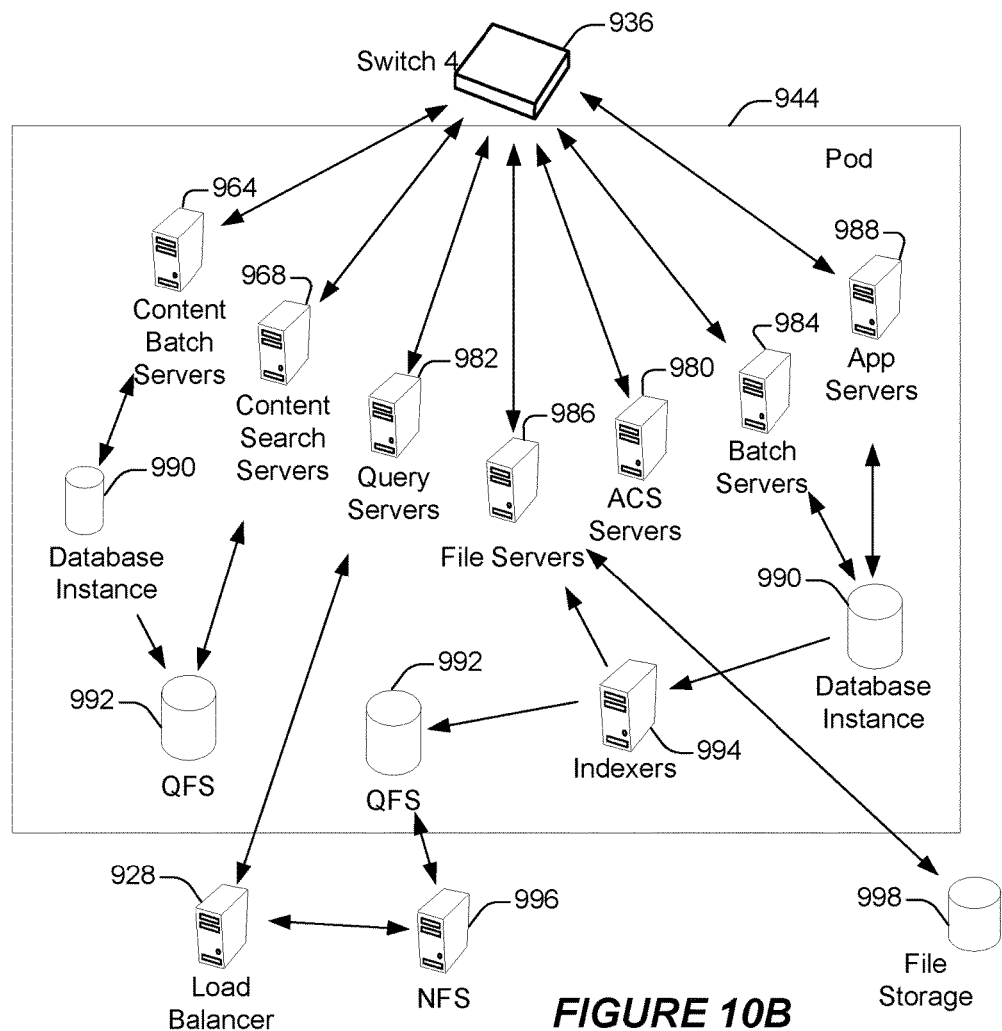
FIG. 10B shows a system diagram further illustrating an example of architectural components of an on-demand database service environment, in accordance with some implementations.

As shown in FIGS. 10A and 10B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 10A and 10B, some implementations of an on-demand database service environment may include anywhere from one to many devices of each type. Also, the on-demand database service environment need not include each device shown in FIGS. 10A and 10B, or may include additional devices not shown in FIGS. 10A and 10B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 10B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 10A and 10B.

FIG. 10B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

Some but not all of the techniques described or referenced herein are implemented as part of or in conjunction with a social networking database system, also referred to herein as a social networking system or as a social network. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. These various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail herein.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described herein. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail herein, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can otherwise be generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned herein, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail herein. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
   a database system implemented using a server system comprising one or more processors, the database system configurable to cause:
   providing access to at least one database storing a plurality of different service feature templates and at least one database storing a plurality of customer relationship management (CRM) records;
   processing a request for a service console, the service console being a graphical user interface system capable of processing user interactions with a plurality of console components of the service console;
   identifying a subset of the service feature templates;
   displaying a graphical representation of the subset of service features templates in a user interface on a display of a device of a user;
   processing a selection received from the user device of a first one of the subset of service feature templates, the first service feature template corresponding to a first one of the console components, the first service feature template being user-configurable to configure the first console component;
   identifying a subset of the CRM records as being associated with the user and with the first service feature template; and
   displaying a graphical representation of the service console in the user interface on the display of the user device, the graphical representation of the service console comprising a representation of the first console component, the first console component having been configured and generated based on the first service feature template and based on the identified subset of CRM records, the representation of the first console component configured to present data of the identified subset of CRM records.

2. The system of claim 1, the database system further configurable to cause:
   displaying in the user interface a visual indicator indicating that the first console component was successfully generated.

3. The system of claim 1, the database system further configurable to cause:
   displaying in the user interface a list of console components comprising the first console component.

4. The system of claim 1, the database system further configurable to cause:
   processing a request to add a new CRM record to the identified subset of CRM records; and
   updating the representation of the first console component to present a portion of data from the new CRM record.

5. The system of claim 1, the database system further configurable to cause:
   determining, using the database system, that an updated version of the first service feature template was created, the updated version of the first service feature template comprising at least one updated console component.

6. The system of claim 5, the database system further configurable to cause:
   responsive to the determination that the updated version of the first service feature template was created, displaying a feed item in a social network feed in a second user interface, the feed item comprising or identifying the updated version of the first service feature template; and
   processing a request for a second service console to be generated based on the updated version of the first service feature template.

7. The system of claim 1, wherein the first console component comprises at least one of: a case highlight, a knowledge article sidebar, a case contact lookup, or a case milestone.

8. A method comprising:
   providing access, through a database system implemented using a server system, to at least one database storing a plurality of different service feature templates and at least one database storing a plurality of customer relationship management (CRM) records;

processing a request for a service console, the service console being a graphical user interface system capable of processing user interactions with a plurality of console components of the service console;

identifying a subset of the service feature templates;

causing display of a graphical representation of the subset of service features templates in a user interface on a display of a device of a user;

processing a selection received from the user device of a first one of the subset of service feature templates, the first service feature template corresponding to a first one of the console components, the first service feature template being user-configurable to configure the first console component;

identifying a subset of the CRM records as being associated with the user and with the first service feature template; and causing display of a graphical representation of the service console in the user interface on the display of the user device, the graphical representation of the service console comprising a representation of the first console component, the first console component having been configured and generated based on the first service feature template and based on the identified subset of CRM records, the representation of the first console component configured to present data of the identified subset of CRM records.

9. The method of claim 8, the method further comprising:
causing display in the user interface of a visual indicator indicating that the first console component was successfully generated.

10. The method of claim 8, the method further comprising:
causing display in the user interface of a list of console components comprising the first console component.

11. The method of claim 8, the method further comprising:
processing a request to add a new CRM record to the identified subset of CRM records; and
updating the representation of the first console component to present a portion of data from the new CRM record.

12. The method of claim 8, the method further comprising:
determining, using the database system, that an updated version of the first service feature template was created, the updated version of the first service feature template comprising at least one updated console component.

13. The method of claim 12, the method further comprising:
responsive to the determination that the updated version of the first service feature template was created, causing display of a feed item in a social network feed in a second user interface, the feed item comprising or identifying the updated version of the first service feature template; and
processing a request for a second service console to be generated based on the updated version of the first service feature template.

14. A non-transitory computer-readable medium storing computer-readable program code to be executed by at least one processor, the program code comprising instructions configurable to cause:
providing access, through a database system implemented using a server system, to at least one database storing a plurality of different service feature templates and at least one database storing a plurality of customer relationship management (CRM) records;

processing a request for a service console, the service console being a graphical user interface system capable of processing user interactions with a plurality of console components of the service console;

identifying a subset of the service feature templates;

displaying a graphical representation of the subset of service features templates in a user interface on a display of a device of a user;

processing a selection received from the user device of a first one of the subset of service feature templates, the first service feature template corresponding to a first one of the console components, the first service feature template being user-configurable to configure the first console component;

identifying a subset of the CRM records as being associated with the user and with the first service feature template; and displaying a graphical representation of the service console in the user interface on the display of the user device, the graphical representation of the service console comprising a representation of the first console component, the first console component having been configured and generated based on the first service feature template and based on the identified subset of CRM records, the representation of the first console component configured to present data of the identified subset of CRM records.

15. The non-transitory computer-readable medium of claim 14, the instructions further configurable to cause:
displaying in the user interface a visual indicator indicating that the first console component was successfully generated.

16. The non-transitory computer-readable medium of claim 14, the instructions further configurable to cause:
displaying in the user interface a list of console components comprising the first console component.

17. The non-transitory computer-readable medium of claim 14, the instructions further configurable to cause:
processing a request to add a new CRM record to the identified subset of CRM records; and
updating the representation of the first console component to present a portion of data from the new CRM record.

18. The non-transitory computer-readable medium of claim 14, the instructions further configurable to cause:
determining, using the database system, that an updated version of the first service feature template was created, the updated version of the first service feature template comprising at least one updated console component.

19. The non-transitory computer-readable medium of claim 18, the instructions further configurable to cause:
responsive to the determination that the updated version of the first service feature template was created, displaying a feed item in a social network feed in a second user interface, the feed item comprising or identifying the updated version of the first service feature template; and
processing a request for a second service console to be generated based on the updated version of the first service feature template.

20. The non-transitory computer-readable medium of claim 14, wherein the first console component comprises at least one of: a case highlight, a knowledge article sidebar, a case contact lookup, or a case milestone.

* * * * *